United States Patent
Chalmers

(10) Patent No.: US 9,030,563 B2
(45) Date of Patent: May 12, 2015

(54) VIDEO ARCHIVAL SYSTEM

(76) Inventor: Hamish Chalmers, Sevenoaks (GB)

( * ) Notice: Subject to any disclaimer, the term of this patent is extended or adjusted under 35 U.S.C. 154(b) by 1148 days.

(21) Appl. No.: 12/526,444

(22) PCT Filed: Feb. 7, 2008

(86) PCT No.: PCT/GB2008/000437
§ 371 (c)(1),
(2), (4) Date: Mar. 4, 2010

(87) PCT Pub. No.: WO2008/096150
PCT Pub. Date: Aug. 14, 2008

(65) Prior Publication Data
US 2010/0171833 A1    Jul. 8, 2010

(30) Foreign Application Priority Data

Feb. 7, 2007   (GB) .................................. 0702378.1

(51) Int. Cl.
*H04N 7/18*     (2006.01)
*H04N 5/232*    (2006.01)
*G08B 13/196*   (2006.01)

(52) U.S. Cl.
CPC ........... *H04N 7/181* (2013.01); *H04N 5/23206* (2013.01); *G08B 13/196* (2013.01)

(58) Field of Classification Search
CPC .................... G06F 17/30017; G06F 17/30781; H04N 5/232–5/23206; H04N 5/181–5/185
See application file for complete search history.

(56) References Cited

U.S. PATENT DOCUMENTS

| 5,321,396 A | 6/1994 | Lamming et al. |
| 6,989,745 B1 | 1/2006 | Milinusic et al. |
| 2002/0113697 A1 | 8/2002 | Kaganer |
| 2003/0179301 A1* | 9/2003 | Feldis et al. ............... 348/231.3 |
| 2004/0212637 A1* | 10/2004 | Varghese ................... 348/231.3 |
| 2005/0132414 A1* | 6/2005 | Bentley et al. ................ 348/143 |
| 2005/0271250 A1* | 12/2005 | Vallone et al. ................ 348/143 |
| 2006/0070108 A1 | 3/2006 | Renkis |
| 2007/0009104 A1* | 1/2007 | Renkis .......................... 380/270 |
| 2007/0159323 A1* | 7/2007 | Rockefeller et al. .......... 348/135 |
| 2007/0283004 A1* | 12/2007 | Buehler ....................... 709/224 |
| 2010/0002082 A1* | 1/2010 | Buehler et al. ................ 348/159 |
| 2010/0071013 A1* | 3/2010 | Vandermolen et al. ....... 725/109 |

FOREIGN PATENT DOCUMENTS

| DE | 42 20 316 A1 | 1/1993 |
| EP | 0 712 240 A1 | 5/1996 |
| EP | 1 480 178 A2 | 11/2004 |
| GB | 2 354 657 A | 3/2001 |
| GB | 2 375 682 A | 11/2002 |
| GB | 2 408 886 A | 6/2005 |
| GB | 2 413 229 A | 10/2005 |
| JP | 2002-077885 A | 3/2002 |
| JP | 2004-120178 A | 4/2004 |
| WO | WO 97/07486 A1 | 2/1997 |

* cited by examiner

*Primary Examiner* — Patrice Winder
(74) *Attorney, Agent, or Firm* — Blakely Sokoloff Taylor & Zafman

(57) ABSTRACT

A video archival system for recording events of interest is disclosed. The system comprises: a video camera for providing video data for a location; a remote control device having user operable controls for enabling a user to identify the event of interest and a transmitter for wirelessly transmitting event data; a receiver for wirelessly receiving the event data from the remote control device; and a data recorder for recording the video data provided by the video camera. The system is arranged to use the event data received by the receiver to identify the video data for the event of interest.

8 Claims, 2 Drawing Sheets

…

VIDEO ARCHIVAL SYSTEM

Figure 1:
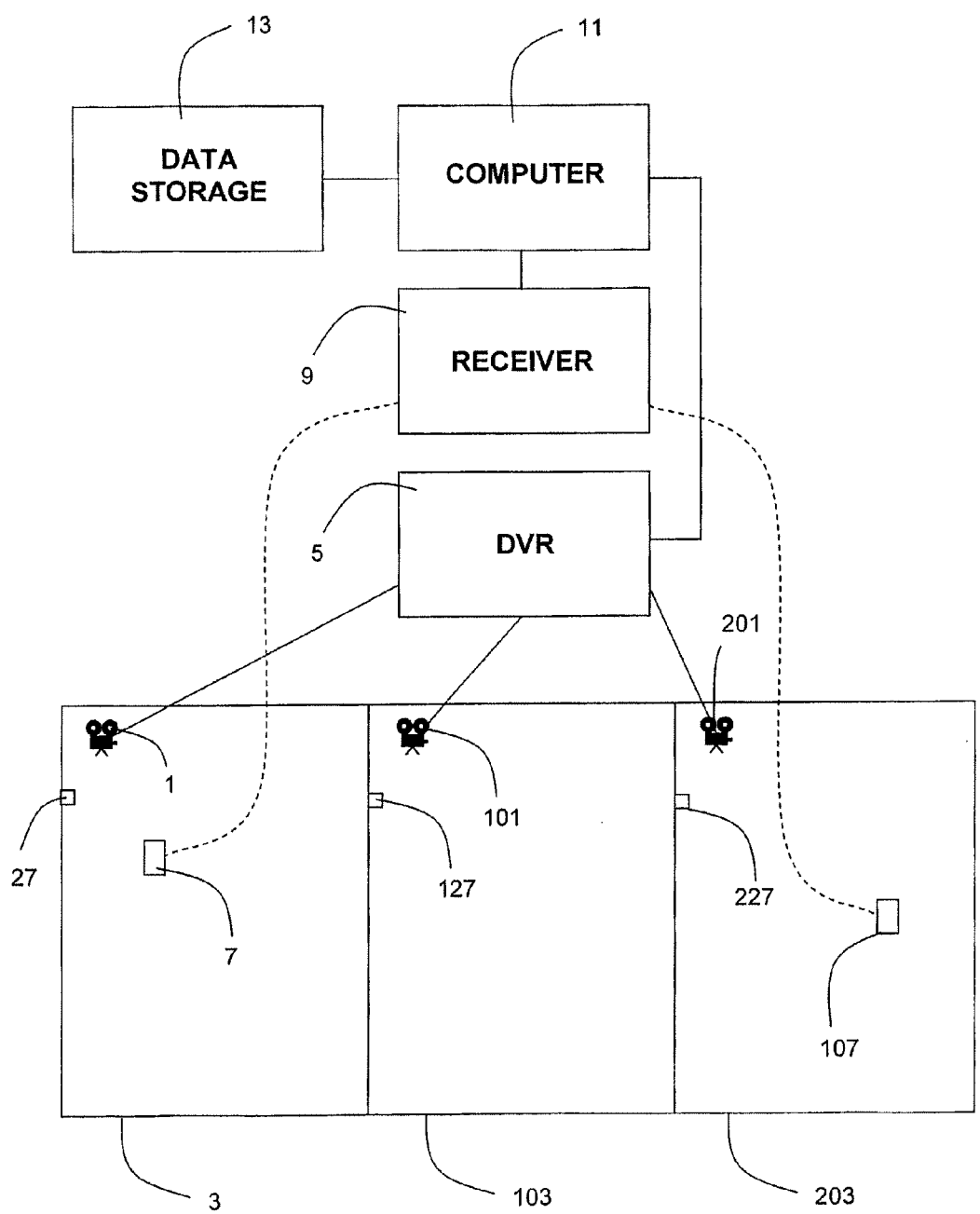

The present patent application is a national phase application of International Application No. PCT/GB2008/000437, filed Feb. 7, 2008.

This invention relates to an archival system. In particular, this invention relates to an archival system for use in archiving clips of video data for events of interest.

It is known to transmit video signals from video cameras to remotely located monitors for surveillance purposes. Such systems are known as closed circuit television (CCTV) systems, and are increasingly to be found in public locations. The positive effects of closed circuit television systems include increased crime prevention and crime detection.

In some applications, for example on buses and trains, the video signals are recorded, for example on an analogue or digital video recorder. This avoids the need for real time monitoring of the signals. The recorded signals may also serve as permanent evidence of what has been observed.

Closed circuit televisions systems are increasingly being implemented in private businesses and in public service organisations, such as schools. It has been recognised in such applications that, if the video signals are recorded, the systems may also serve as professional development tools.

A problem associated with the use of closed circuit television systems in which the video signals are recorded is the difficulty of finding data for a historical event of interest. In particular, even if the approximate timing of the event is known, a system operator may need to trawl through several hours, if not days of data, to find the relevant clip. A further problem relates to the fact that systems usually have a limited data storage capacity and therefore repeatedly overwrite the data in a loop. As such, a system operator may find that the data for a historical event of interest has been overwritten, and cannot therefore be retrieved.

It is known to implement a closed circuit television system is which the video data is only recorded during certain times, for example during normal working hours, thereby reducing the amount of unwanted data that is recorded by the system. It is also known to implement a system in which the video data is only recorded when motion is detected in a location of interest. However, in both of these systems, large amounts of unwanted data are still recorded, making it difficult to retrieve the data for particular events of interest.

According to the invention, there is provided a video archival system for recording events of interest, the system comprising: a video camera for providing video data for a location; a remote control device having user operable controls for enabling a user to identify the event of interest and a transmitter for wirelessly transmitting event data; a receiver for wirelessly receiving the event data from the remote control device; and a data recorder for recording the video data provided by the video camera; wherein the system is arranged to use the event data received by the receiver to identify the video data for the event of interest.

The invention provides a system which enables a user to conveniently identify isolated events, or clips, within raw video data which may represent many hours of footage, using a wireless remote control device. If the video data is routinely recorded, then the event data may be used to copy the specific video data for the event to a separate location, or the position of the video data for the event may be marked in some way. Whether or not the video data is routinely recorded, the event data may be used simply to record the video data for the event to a separate location, such as the hard disk drive of a personal computer.

The system may be used to create an archive of events of interest for evidential or professional development (training) purposes. For example, the events may be examples of best teaching practice in a classroom.

The user operable controls of the remote control device may comprise a control for identifying the timing of the event of interest. If the timing of the event is identified in real time, i.e. as it happens, then it may simply be identified by triggering the control at the moment the event happens. In this case, the time at which the event data is transmitted and/or received may be representative of the timing of the event, or else the event data may encode the timing of the event in some way.

If the timing of the event of interest is identified by a single trigger of the control, then the system may be arranged to identify the video data for the event by automatically calculating a time frame for the event. For example, the system may calculate the time frame as extending from a fixed period of time before or after the trigger to a fixed period of time before or after the trigger.

If the timing of the event is identified by two triggers of the control (or controls), then the system may calculate the time frame as extending from a time based on the first trigger to a time based on the second trigger.

Alternatively, a user may identify the timing of a historical event using the controls, for example an event that happened two minutes previously. In this case, the event data encodes the timing of the event, since the time at which the event data is transmitted and/or received may bear no relation to the timing of the event.

In preferred embodiments, the user operable controls of the remote control device comprise controls for identifying the nature of the event of interest, and the event data encodes the identified nature of the event. For example, the controls may comprise a pair of controls for identifying positive and negative events.

The user operable controls of the remote control device may comprise controls for identifying a person or group of persons associated with the event of interest, and the event data then encodes the person or group of persons associated with the event. A list of persons may be stored in the remote control device and selected using curser controls and a display, such as an LCD.

The system may comprise a plurality of video cameras for providing video data for different locations, for example different rooms, and the data recorder is then for recording the video data provided by the plurality of video cameras. The user operable controls of the remote control device may then comprise controls for identifying a camera or location associated with the event of interest. Alternatively, the remote control device may comprise means for automatically identifying its location.

The means for automatically identifying the location may comprise a Radio Frequency Identification (RFID) reader. In this case, the system further comprises a plurality of Radio Frequency Identification (RFID) transponders associated with respective ones of the locations.

The means for automatically identifying the location may comprise a satellite positioning system receiver, for example a GPS receiver, or a local positioning system receiver arranged to use a triangulation technique to identify the location of the remote control device.

The system may further comprise means for changing the direction of a video camera, i.e. its field of view. The video cameras may be directed at an identified location of the remote control device.

The remote control device may comprise further functionality, such as a microphone and/or a video camera for providing audio and/or video data. Such a feature may be useful in locations not clearly covered by fixed cameras.

The remote control device may further comprise data storage means for storing the event data. Such a feature is useful where the device is outside a communication range for the receiver.

In a preferred embodiment, the system comprises a plurality of remote control devices for use by different users in different locations. The remote control devices may then be arranged to communicate with one another, for example to broadcast an alert signal to the other remote control devices.

According to another aspect of the invention, there is provided a method of recording events of interest, the method comprising: operating a video camera to provide video data for a location; identifying the event of interest using a remote control device, wherein the remote control device wirelessly transmits event data for the event of interest; wirelessly receiving the event data from the remote control device; and recording the video data provided by the video camera, wherein the event data received by the receiver is used to identify the video data for the event of interest.

Figure 2:
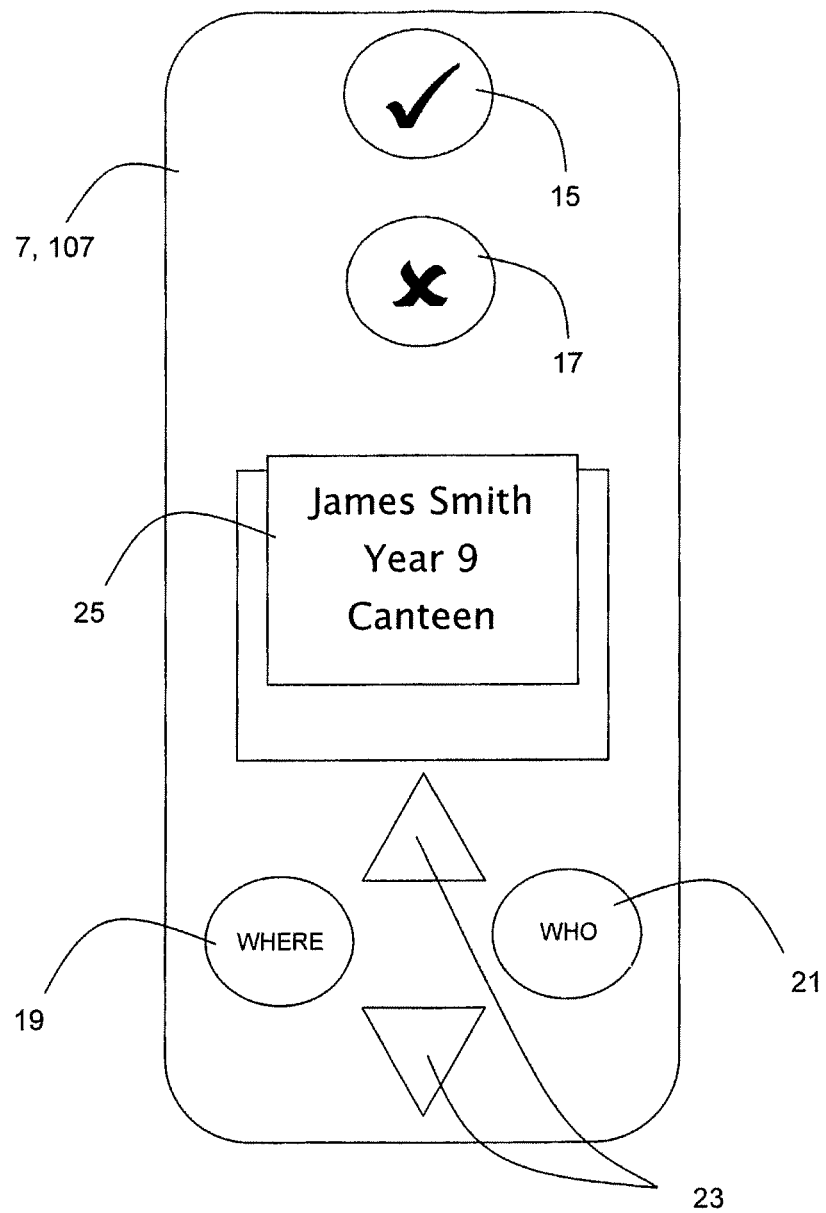

A preferred embodiment of the invention will no be described in detail, by way of example only, with reference to the following drawings:

FIG. 1 is a schematic view of a video archival system according to the invention; and FIG. 2 is a view of a remote control device, which is one of the components of the system shown in FIG. 1.

The invention provides a video archival system for recording events of interest. The system enables a user to conveniently identify the video data for events of interest, which data is then archived for evidential or professional development (training) purposes.

FIG. 1 shows an exemplary video archival system according to the invention, in schematic form. Referring to the Figure, the system comprises a plurality of video cameras 1, 101, 201 in respective different rooms 3, 103, 203 of a building. The video cameras 1, 101, 201 are fixed to the walls of the rooms 3, 103, 203 and are arranged to provide video data for the rooms 3, 103, 203. The video camera 1, 101, 201 are small in size so as to be discrete in operation.

The video cameras 1, 101, 201 are connected by wires to a digital video recorder 5. The digital video recorder 5 is arranged to receive a flow of digital video data from the video cameras 1, 101, 201 and to record the data. The data is recorded in a loop, so that older video data is continuously overwritten by more recent video data. The digital video recorder is arranged to record the data from all three video cameras 1, 101, 201 at the same time. At any one time, the digital video recorder 5 holds two hours worth of data from the video cameras 1, 101, 201.

To the above extent the system is conventional, representing a multi-location video monitoring and recordal system.

In addition to the video cameras 1, 101, 201 and the digital video recorder 5, the system comprises a plurality of remote control devices 7, 107, a receiver 9 and a computer 11 having a hard disk drive 13.

The remote control devices 7, 107 are small, portable hand held devices. In the example, two remote control devices 7, 107 are being carried by users (not shown) in two of the rooms 3, 203. The remote control devices 7, 107 are for use by the users in identifying events of interest, and will be described in more detail with reference to FIG. 2.

FIG. 2 is a front view of one of the remote control devices 7, 107. The device is battery operated, and comprises a number of user operable controls and a wireless transmitter (not shown).

The user operable controls of the remote control device 7, 107 comprise event buttons 15. The event buttons 15, 17 are used by the user to identify the timing and nature of an event of interest. For example, if the user becomes aware of a positive event, he presses the event button 15 having the "tick" symbol. The time at which the button is pressed is representative of the timing of the event of interest.

The user operable controls of the remote control device 7, 107 also comprise a "where" button 19, a "who" button 21 and curser buttons 23. These buttons and a liquid crystal display 25 enable the user, after having pressed an event button 15, 17, to identify a location and a person or group of persons involved in the event of interest.

The wireless transmitter is arranged to transmit, in response to the operation of the event buttons 15, 17, event data which encodes the timing and nature of the event of interest, together with the location and the person or persons involved in the event. The transmitter transmits radio frequency signals, and line of sight between the transmitter and a receiver 9 is not therefore required.

Referring again to FIG. 1, the receiver 9 of the system is arranged centrally to wirelessly receive the event data from the remote control devices 7, 107. The event data is passed to a computer 11.

The computer 11 is a standard PC and is arranged to use the event data received from the receiver 9 to identify the location of the video data for the event of interest on the digital video recorder 5. Having identified its location, the data for the event of interest is copied onto a hard disk drive 13 which is coupled to the computer 11.

The computer 11 is arranged to identify the video data for the event of interest using a number of settings which can be manually adjusted using the computer 11. In particular, the computer 11 decodes the timing of the event of interest, i.e. the time at which an event button 15, 17 was pressed, from the event data. Based on this time, the video data is identified. According to the settings, the video data clip is taken to begin a fixed time period before the button press and to end a fixed time period after the button press. The settings may, for example, be such that the video data clip begins ten minutes before the button press and ends five minutes afterwards, making a total video clip length of fifteen minutes.

Having identified the video data for the event of interest, the computer 11 is arranged to copy it from the digital video recorder 5 to the hard disk drive 13 for future reference. At this time, labels are attached to the video data indicating the nature of the event, the location of the event and the person or persons involved in the event, each decoded from the event data.

Typically, a plurality of users will each carry a remote control device 1, 107. Upon becoming aware of an event of interest, a user will press one of the event buttons 15, 17. The remote control device 1, 107 then prompts the user to enter further information regarding the event.

Firstly, the user is prompted to identify a person or group of persons involved in the event from a list displayed on the liquid crystal display 25. The person or group of persons is selected using the "who" button 21.

Secondly, the user is prompted to identify a location of the event from a list displayed on the display 25. The location is selected using one of two methods. Firstly, the location can simply be selected by pressing the "where" button. Alternatively, the location can be selected by holding the remote control device 7, 106 against a radio frequency identification (RFID) tag 27, 127, 227 mounted in the user's location. In this case, a radio frequency identification (RFID) reader in the remote control device 7, 107 reads information encoded on the tag to identify the relevant location.

Having received all of the appropriate information, the timing and nature of the event, and the location and person or group of persons involved in the event are encoded as event data. A wireless transmitter in the remote control device 7, 107 then transmits the event data to a centrally located wireless receiver 9.

As described above, the computer 11 is arranged to use the event data to copy the video data for the event from the digital video recorder 5 to the hard disk drive 13 for longer term storage. Labels are attached to the video data to facilitate later retrieval from a large collection of archived clips of video data.

While the video data on the digital video recorder 5 is overwritten at regular intervals, the clips of video data on the hard disk drive 13 are retained until they are manually deleted. Thus, the clips can be used at a later date for evidential and/or personal development purposes.

A single preferred embodiment has been described above. However, various modifications and additions may be made without departing from the scope of the invention.

For example, the digital video recorder may be replaced by a separate unit for each video camera, which are all then linked to the computer. In the example, data is transferred and stored in digital form, for example using an MPEG standard, but in alternative embodiments analogue data may be used.

The remote control device may have additional functionality. For example, the device may be provided with its own video camera for use in locations not covered by a fixed video camera. The video data from this camera may either be wirelessly transmitted or locally stored for future downloading. Microphones may also be provided, either with the fixed cameras or as part of the remote control device.

The remote control device may have data storage means for recording the event data in case it is not successfully transmitted and received.

The remote control device may comprise a satellite or local positioning receiver for accurately determining its location. In this case, the system may be arranged to adjust the direction of the relevant video camera so that it is always directed towards the location of the remote control device.

The remote control devices may be provided with means form communication with each other. This could, for example, be used by a user for broadcasting an alert signal to other users.

In one embodiment, the digital video recorder is not provided, and video data for the cameras is not routinely recorded. Instead, only the video data for the events of interest is recorded, and this is directly onto the hard disk drive coupled to the computer.

In the embodiment described above, the clip of video data for an event of interest is determined as beginning a fixed time period before a button press and ending a fixed time period after a button press. However, alternative techniques are envisaged, including one based on two button presses.

In the embodiment described above, video data for the events of interest is saved onto a hard disk drive coupled to a computer. This hard disk drive may form part of an email server, and the coupling may be over a computer network or the internet. In this way, according to the invention, the video data for the events of interest may be attached to and sent with emails.

Its is described above that the location of an event of interest may be identified by interrogating a radio frequency identification (RFID) tag positioned in the location using an RFID reader integrated into a remote control device. As an alternative, an RFID tag may be provided in the remote control device, with an RFID reader being provided in each location and connected to the system. Location can then be identified in essentially the same way, by associating the remote control device with something provided in the location.

Where the remote control device comprises an RFID tag, the tag could provide access control functionality, for example by operating door locks controlled by an access control system.

The invention claimed is:

1. A video archival system for recording events of interest, the system comprising:
    a video camera for providing video data for a location;
    a plurality of remote control devices each having:
        user operable controls for enabling a user to identify in real time a timing, the location, at least one person associated with, and the nature of an event of interest; and
        a transmitter for encoding and wirelessly transmitting event data representing the timing, the location, the at least one person, and the nature of the event of interest, as identified by the user;
    a receiver for wirelessly receiving the event data from the remote control devices;
    a data recorder for recording the video data provided by the video camera; and
    a processor coupled to a data store, wherein the processor is arranged to use the event data received by the receiver to determine the timing of the event of interest, and the video data for the event of interest from the data recorder and to copy the video data for the event of interest from the data recorder to the data store,
    wherein the remote control devices are arranged to communicate with one another, wherein the user operable controls of each remote control device comprise a broadcast control, and wherein each remote control device is arranged to broadcast a signal to the other remote of devices upon operation of the broadcast control.

2. The system of claim 1, wherein the user operable controls of the remote control device comprise controls for identifying the at least one person associated with the event of interest, and wherein the event data encodes the at least one person associated with the event of interest.

3. The system of claim 1 or 2, wherein the system comprises a plurality of video cameras for providing video data for different locations, wherein the data recorder is for recording the video data provided by the plurality of video cameras, and wherein the user operable controls of the remote control device comprise controls for identifying a camera or location associated with the event of interest.

4. The system of claim 1 or 2, wherein the system comprises a plurality of video cameras for providing video data for different locations, wherein the data recorder is for recording the video data provided by the plurality of video cameras, and wherein the remote control device comprises means for identifying its location.

5. The system of claim 4, further comprising a plurality of Radio Frequency Identification (RFID) transponders associated with respective ones of the locations, and wherein the means for identifying comprises a Radio Frequency Identification (RFID) reader.

6. The system of claim 4, wherein the means for identifying comprises a satellite positioning system receiver or a local positioning system receiver arranged to use a triangulation technique to identify the location of the remote control device.

7. The system of claim 1 or 2, wherein the remote control device further comprises at least one of a microphone and a video camera for providing at least one of audio and video data.

8. The system of claim 1 or 2, wherein the remote control device further comprises data storage for storing the event data.

\* \* \* \* \*

UNITED STATES PATENT AND TRADEMARK OFFICE
CERTIFICATE OF CORRECTION

PATENT NO. : 9,030,563 B2  
APPLICATION NO. : 12/526444  
DATED : May 12, 2015  
INVENTOR(S) : Hamish Chalmers Page 1 of 1

It is certified that error appears in the above-identified patent and that said Letters Patent is hereby corrected as shown below:

In the Claims, Column 6, Claim 1, line 38, please delete "of", and insert --control--.

Signed and Sealed this  
First Day of March, 2016

Michelle K. Lee  
*Director of the United States Patent and Trademark Office*